United States Patent Office 2,848,437
Patented Aug. 19, 1958

2,848,437

METALORGANIC COMPOUNDS AS INITIATORS FOR THE POLYMERIZATION OF FORMALDEHYDE

William P. Langsdorf, Jr., Wilmington, and Gelu S. Stamatoff, Newark, Del., assignors to E. I. du Pont de Nemours and Company, Wilmington, Del., a corporation of Delaware No Drawing. Application April 16, 1954
Serial No. 423,855

7 Claims. (Cl. 260—67)

This invention relates to a new class of compounds which are capable of initiating the polymerization of formaldehyde, and more particularly, it relates to the preparation of high molecular weight formaldehyde polymers by processes utilizing these metalorganic compounds as initiators.

In copending application Serial No. 408,172, filed by R. N. MacDonald on February 4, 1954, there are disclosed and claimed new tough, high molecular weight polymers of formaldehyde. It is disclosed in this copending application that the initiators which may be used to effect the polymerization include amines, phosphines, arsines, or stibines. It has now been found that an entirely new class of compounds is useful for initiating the polymerization of formaldehyde.

It is an object of this invention to provide a new class of formaldehyde polymerization initiators. It is another object of this invention to provide processes for polymerizing formaldehyde in the presence of metalorganic compounds as initiators. Other objects will be apparent from the detailed explanation of the invention.

The above objects are accomplished by contacting purified formaldehyde vapors with a metalorganic compound in a liquid reaction medium which is inert to the formaldehyde and to the metalorganic compound, and allowing the formaldehyde to polymerize to a high molecular weight polymer.

The metalorganic compound employed in this invention is defined as $$R_nM$$

where R is an organic radical selected from the group consisting of hydrogen, hydrocarbon, oxyhydrocarbon, thiohydrocarbon, and acyloxy, n is any integer from 1 to 4, and M is a metal or a halide of a multivalent metal. The term "metal" is meant to be the same as that defined in Gilman's "Organic Chemistry," volume I, p. 491, second edition, John Wiley & Sons (1947). Gilman's definition of metals excludes from the periodic table two groups of elements (1) the non-metals (H, N, O, S, F, Cl, Br, He, Ne, A, Kr, Xe, and Rn) and (2) the elements that have some properties of metals but are not classifiable as such (B, C, Si, P, As, Sb, Se, Te, Po, I, and Element 85). It will be seen that the term "metalorganic" is meant to include compounds in which the metal is bonded to a carbon atom in the organic radical, such a compound usually being termed by chemists as an "organometallic compound" as well as compounds wherein the metal is bonded to oxygen, sulfur or halogen, such compounds including the metal soaps, metal salts, Grignard reagents, etc. Examples of the metalorganic compounds which are intended to be included in the above formula, $R_nM$, are phenyl-lithium, methoxyphenylsodium, decoxysodium, copper mercaptide, copper abietate, copper stearate, methylmagnesium iodide, phenylmagnesium bromide, diethoxymagnesium, calcium hydride, dimethylcadmium, diphenylmercury, aluminum isopropoxide, aluminum stearate, tetraisopropyltitanate, diphenyltin, triphenylbismuth, dicyclopentadienyliron, and others.

In the following examples there are illustrated several processes employing metalorganic compounds as polymerization initiators. Parts and percentages are based on weight unless otherwise noted. Inherent viscosities are measured in dimethylformamide solution at 150° C., the solution containing 0.5 gram of polymer and 1 gram of diphenylamine per 100 ml. of dimethylformamide.

*Examples 1 to 7.*—In each of the examples of this series the following procedure was employed:

Five hundred grams of commercial paraformaldehyde was pyrolyzed at 165° C. and vented to the atmosphere over a period of 70 to 90 minutes. After this initial period of venting the pyrolysis vapors, as soon as they were formed, were continuously passed through a series of 2 to 4 U-tube traps maintained at 0° C. and thence into a polymerization reactor containing a liquid hydrocarbon as the reaction medium. The hydrocarbon reaction medium contained the metalorganic initiator in the amount indicated in Table I. In this series of examples n-heptane was used as the reaction medium. The reactor was a one-liter glass vessel fitted with a glass stirrer. The reaction medium was prepared by placing 550 ml. of distilled n-heptane in the reactor, followed by topping to remove 50 ml. of the n-heptane, and then adding the initiator prior to introduction of formaldehyde monomer. The reaction medium was agitated by the stirring mechanism at about 300 R. P. M. and was kept at 11° C. to 34° C. during the polymerization reaction which continued for two hours. After the polymerization was completed the polymeric dispersion was filtered, the solids were washed several times with cyclohexane and/or ether, and the washed product was dried in a vacuum oven at 40°–70° C. In each of the experiments the white polymeric formaldehyde product was tested to determine its inherent viscosity and these results are reported in Table I. The polymers were tough and could be molded into films by pressing for 1 minute at about 200° C. without excessive thermal degradation.

*Table I*

| Example | Polymerization Initiator | Amount of Polymerization Initiator Used (grams) | Amount of Polymer Recovered (grams) | Inherent Viscosity [1] (measured in dimethylformamide) |
|---|---|---|---|---|
| 1 | Dimethylcadmium | 0.041 | 55.2 | 1.25, 0.72 |
| 2 | Methylmagnesium iodide | 0.096 | 33.7 | 1.57, 1.49 |
| 3 | Phenylmagnesium bromide | 0.1 | 32.4 | 0.76, 0.82 |
| 4 | Triphenylbismuth | 0.076 | 8.3 | 2.03 |
| 5 | Calcium hydride | 0.0072 | 0.11 | [2] |
| 6 | Diphenylmercury | 0.078 | 0.6 | 1.22, 1.19 |
| 7 | Diphenyltin | 0.0039 | 35.3 | 3.61, 3.66 |

[1] Two values are reported for inherent viscosity where duplicate determinations were made on the same polymer sample.
[2] Not determined.

*Examples 8 to 11.*—In this series of examples the monomeric formaldehyde was prepared by pyrolyzing cyclohexyl hemiformal to produce formaldehyde vapors in the manner described and claimed in copending application Serial No. 368,513, filed by D. L. Funck on July 16, 1953. The formaldehyde vapors from the pyrolysis of cyclohexyl hemiformal were then passed through 2 to 4 U-tube traps held at 0° C. and thence into a reaction which was the same as described in Examples 1 to 7. All ingredients and reaction conditions were identical with those described in Examples 1 to 7 with the exception that in Examples 10 and 11 the hydrocarbon reaction medium comprised 250 ml. of benzene rather than 500 ml. of n-heptane. In each of these experiments the white powdery polymeric formaldehyde product was tested to determine its inherent viscosity, the results of which are reported in Table II. Each of the polymer products could be molded into films by pressing for 1 minute at about 200° C. without excessive thermal degradation.

Table II

| Example | Polymerization Initiator | Amount of Polymerization Initiator Used (grams) | Amount of Polymer Recovered (grams) | Inherent Viscosity [1] (measured in dimethylformamide) |
|---|---|---|---|---|
| 8 | Aluminum isoproproxide (triisopropoxyaluminum). | 0.0033 | 25.4 | 2.61, 2.72 |
| 9 [2] | Decoxysodium | 0.003 | 47.5 | 2.08, 2.10 |
| 10 | Benzyloxysodium | 0.003 | 28.0 | 0.97, 0.72 |
| 11 | Phenyllithium | 0.005 | 12.7 | 0.71, 0.72 |

[1] Two values of inherent viscosity are reported because duplicate determinations were made on the same polymer sample.
[2] The temperature of the reaction medium for Example 9 was −28° C. to −32° C.

*Example 12.*—Formaldehyde monomer generated from cyclohexyl hemiformal as described in Examples 8 to 11 was continuously passed into a polymerization reactor containing 2.5 liters of dry benzene and .0085 gram of aluminum isopropoxide (triisopropoxy aluminum). The reaction continued over a period of 280 minutes while the benzene reaction medium was maintained at 30° C. and was agitated with a stirring mechanism. The polymeric formaldehyde formed continuously during the reaction as a white powder and was separated from the benzene by filtration, following which the polymer was washed three times with one liter of cyclohexane each time, and finally dried in a vacuum oven at 60° C. for 16 hours. The recovered polymer weighed 156 grams and exhibited an inherent viscosity of 0.35 to 0.47 measured in dimethylformamide as described above. This polymer was tested for thermal stability by determining the reaction rate constant for thermal degradation of the polymer at 222° C., in the manner described in copending application Serial No. 443,702, filed by Dal Nogare and Punderson on July 15, 1954, now abandoned. The constant for the polymer of this example was 0.24% by weight per minute, indicating an excellent thermal stability.

*Example 13.*—In an experiment similar to that described in Example 12 formaldehyde monomer was introduced continuously into a reaction medium comprising 400 ml. of dry benzene and 0.0027 gram aluminum ethoxide (triethoxyaluminum) and was agitated for 100 minutes at 22° to 28° C. Polymer formed continuously during the reaction period. The white polymeric formaldehyde particles were separated from the reaction medium by filtration, washed successively with benzene, methanol, and ether, and then dried in a vacuum oven at 60° C. for 15 hours. The recovered polymer weighed 24.3 grams and exhibited an inherent viscosity of 1.21 to 1.38 as measured in dimethylformamide.

*Example 14.*—Monomeric formaldehyde was generated by pyrolyzing, at about 110° C., a slurry of commercial paraformaldehyde in cyclohexanol. The pyrolysis vapors were then passed through an empty glass trap maintained at room temperature and thence through a series of 3 U-tubes maintained at about 0° C., the first tube being empty and the second and third tubes being filled with a stainless steel packing material. The formaldehyde monomer leaving the traps was then led into a polymerization reactor containing one liter of heptane which had previously been topped to remove about 10% of the heptane. The heptane contained 0.1 gram of 2-mercaptobenzimidazole. The monomer was introduced into the reactor continuously over a reaction period of two hours while the reaction medium was maintained at 16° to 35° C. The polymerization initiator which was used was dicyclopentadienyl iron which was added in small portions periodically during the reaction time, the total amount of initiator employed being 0.05 gram. The polymeric formaldehyde which formed during the reaction was recovered by filtration and found to amount to 156 grams, the polymer exhibiting an inherent viscosity in dimethylformamide of 4.01. A portion of this polymer was pressed for 1 minute at 204° C. and 15,000 lbs. pressure into a film which was very tough and had an excellent appearance.

*Example 15.*—Monomeric formaldehyde was prepared by pyrolyzing cyclohexyl hemiformal. The pyrolysis vapors were passed through the same system of traps and U-tubes as described in Example 14. Formaldehyde monomer leaving the traps was passed into a reaction medium containing one liter of topped heptane containing 0.094 gram of dicyclopentadienyl nickel and 0.15 gram of 2-mercaptobenzimidazole. The reaction medium was maintained at 17° to 30° C. and the reaction continued over a period of 100 minutes during which time polymeric particles formed continuously in the medium. There was recovered from the reaction medium 70 grams of polymeric formaldehyde having an inherent viscosity in dimethylformamide of 2.64 to 2.76.

*Example 16.*—The procedure described in Example 15 was repeated with the exception that dicyclopentadienyl titanium dichloride was used as the polymerization initiator in place of dicyclopentadienyl nickel of Example 15. The reaction was maintained at a temperature of 14° to 30° C. and the duration of the reaction was 110 minutes. There was recovered 64 grams of polymeric formaldehyde having an inherent viscosity in dimethylformamide of 0.90 to 1.00.

*Example 17.*—Monomeric formaldehyde was generated by heating, at 110° C., a slurry of commercial paraformaldehyde in cyclohexanol. The pyrolysis vapors were then passed through a series of one trap and three U-tubes as described in Example 14. The vapors leaving the U-tubes were then passed into a reaction medium of 1 liter of topped heptane containing 0.02 ml. of tetraisopropyltitanate as a polymerization initiator and 0.5 gram of diphenylamine as an antioxidant. The reaction medium was maintained at 22° C. to 30° C. during the reaction which extended over a period of 75 minutes. The polymeric formaldehyde which was recovered was pressed into tough, translucent films.

*Example 18.*—Monomeric formaldehyde was generated by pyrolyzing at 110° C. a slurry of commercial paraformaldehyde in cyclohexanol. The pyrolysis vapors were then passed through a series of 3 U-tubes maintained at 0° C. The first tube being empty and the two remaining tubes being filled with stainless steel packing material. Monomeric formaldehyde leaving these U-tubes was then passed into a reaction medium of one liter of topped heptane containing as a polymerization initator 0.05 ml. of a complex of tetraisopropyltitanate and ethylacetoacetate. The reacton medium was maintained at a temperature of 21° to 27° C. over a reaction period of 35 minutes. There was recovered from the reaction medium 76.6 grams of polymeric formaldehyde exhibiting an inherent viscosity in dimethylformamide of 0.91.

*Example 19.*—Monomeric formaldehyde was generated and purified in the manner described in Example 14. The purified formaldehyde monomer was then passed into a reaction medium containing one liter of topped heptane and 0.292 gram of aluminum stearate as a polymerization initiator and 0.15 gram of 2-mercaptobenzimidazole. The reaction medium was maintained at a temperature of 17° to 29° C. over the reaction period of 110 minutes. There was recovered 39 grams of polymeric formaldehyde having an inherent viscosity in dimethylformamide of 2.10 to 2.38. Tough, translucent films were pressed from a portion of this polymer.

*Example 20.*—Monomeric formaldehyde was generated by heating at 110° C. a slurry of commercial paraformaldehyde in cyclohexanol. The pyrolysis vapors were then passed through a series of two steam-jacketed condensers followed by two flasks cooled by air at room temperature followed by a series of 3 U-tubes maintained at 0° C. The first U-tube being empty and the remaining two tubes being filled with stainless steel packing. The formaldehyde vapors leaving this series of traps and tubes were passed into a reaction medium containing 1.5 liters of heptane, 0.5 gram of aluminum stearate, and 0.5 gram of a mixed long chain alkyl mercaptan having an average molecular weight of 202 and being chiefly lauryl mercaptan. The reaction medium was maintained at a temperature of 15° to 30° C. over a reaction period of one hour. There was recovered 42 grams of polymeric formaldehyde exhibiting an inherent viscosity in dimethylformamide of 1.89. Tough, translucent films were pressed from this polymer.

*Example 21.*—Monomeric formaldehyde was prepared as described in Example 20 and purified by passing the pyrolysis vapors through a system of condensers, flasks, and U-tubes as described in Example 20. The formaldehyde vapors leaving this system of U-tubes was passed into a reaction medium containing 1.5 liters of topped heptane, 0.5 gram of copper stearate and 0.24 gram of 2-mercaptobenzimidazole. The reaction medium was maintained at a temperature of 12° to 25° C. over a reaction period of 130 minutes. There was recovered 195 grams of polymeric formaldehyde exhibiting an inherent viscosity in dimethylformamide of 3.08. A tough, translucent film was pressed from a portion of this polymer.

*Example 22.*—Monomeric formaldehyde was prepared as described in Example 20 and purified by passing the pyrolysis vapors through a system of condensers, flasks, and U-tubes as described in Example 20. The formaldehyde vapors leaving this system of U-tubes was passed into a reaction medium containing 1.5 liters of topped heptane, 0.5 gram of copper abietate and 0.3 gram of a mixed long chain alkyl mercaptan having an average molecular weight of 202 and being chiefly lauryl mercaptan. The reaction medium is maintained at a temperature of 22° to 36° C. over a reaction period of 220 minutes. There was recovered 248 grams of high molecular weight polymeric formaldehyde. A tough, translucent film was pressed from this polymer.

*Example 23.*—Monomeric formaldehyde was generated by pyrolyzing at 110° C. a slurry of commercial paraformaldehyde in cyclohexanol. The pyrolysis vapors were then passed through one flask cooled at room temperature and a series of 3 U-tubes maintained at 0° C., the first tube being empty and the remaining two being filled with stainless steel packing material. The formaldehyde monomer leaving the U-tubes was passed into a reaction medium of 1.5 liters of topped heptane containing 0.5 gram of copper abietate and 0.2 gram of 2-mercaptoimidazoline. The reaction medium was maintained at a temperature of 49° to 83° C. over the reaction period of 242 minutes. There was recovered 210 grams of polymeric formaldehyde exhibiting an inherent viscosity in dimethylformamide of 1.54 to 1.64. Films were pressed from portions of this polymer.

*Example 24.*—Monomeric formaldehyde was generated as described in Example 23 and was passed through a series of two steam-jacketed condensers and then in series through the flask and U-tubes as described in Example 23. The formaldehyde vapors leaving the U-tubes were passed into a reaction medium of 1.3 liters of topped heptane containing 0.5 gram of copper abietate and 0.2 gram of 2-mercaptobenzthiazole. The reaction medium was maintained at a temperature of 15° to 25° C. over the reaction period of 435 minutes. There was recovered 217 grams of polymeric formaldehyde exhibiting an inherent viscosity in dimethylformamide of 2.86. Films which were pressed from this polymer had a smooth appearance and were very tough.

*Example 25.*—Monomeric formaldehyde was generated and purified as described in Example 23 and was then passed into a reaction medium of 1.3 liters of topped heptane containing 0.5 gram of copper abietate and 0.2 gram of 2-mercaptobenzthiazole. The reaction medium was maintained at a temperature of 15° to 30° C. over a reaction period of 210 minutes. There was recovered 224 grams of polymeric formaldehyde having an inherent viscosity in dimethylformamide of 3.03. Tough, translucent films were pressed from this polymer.

*Example 26.*—Monomeric formaldehyde was generated by pyrolyzing cyclohexyl hemiformal. The pyrolysis vapors were then purified by passing them through a series of 6 traps maintained at 0° C. The first two of which were empty, the second two containing distilled n-heptane, and the last two containing sodium in distilled n-heptane. The purified vapors leaving the last of these traps was then led into a 1-liter reactor containing 500 cc. of redistilled nitrobenzene containing as a catalyst 3.4 mg. of aluminum isopropoxide. The reactors were fitted with stirring mechanisms which operated at about 400 R. P. M. during the reaction and the reactors were placed in a constant temperature bath maintained at 30° C. during the reaction. Monomeric formaldehyde was introduced into the reactor continuously over a period of 115 minutes during which time white polymeric particles formed in the reaction medium as a dispersion. The polymer particles were recovered by filtration followed by washing three times with methanol and drying at 60° C. There was recovered 55 grams of high molecular weight polymeric formaldehyde having an inherent viscosity of 1.90 to 1.95 in dimethylformamide. A portion of this polymer was tested for thermal stability by determining the reaction rate constant for thermal degradation at 202° C. as described in copending patent application Serial No. 443,702, filed by Dal Nogare and Punderson on July 15, 1954, now abandoned, and the constant was found to be 0.065% by weight per minute indicating an excellent thermal stability. A portion of this polymer was molded into a film by pressing for 1 minute at 200° C. and 5000 p. s. i. and the film was found to be tough and could be creased without breaking.

*Example 27.*—Monomeric formaldehyde was generated by pyrolyzing cyclohexyl hemiformal followed by purifying the vapors in a manner similar to that described in Example 26. The reaction medium consisted of 2.5 liters of benzene and 3.98 mg. of magnesium diethoxide as a polymerization initiator. During a reaction period of 2 hours the reaction medium was agitated with a stirring mechanism and maintaining a temperature of 31 to 34° C. The dispersed polymeric particles were recovered by filtration followed by washing with cyclohexane and drying in a vacuum oven at 50° C. There was recovered 47.7 grams of high molecular weight polymeric formaldehyde. A small portion of this polymer was washed twice with methanol and twice with hot water in a Waring Blender, dried at 50° C. under vacuum, and then pressed into a film which was exceptionally tough and which exhibited an inherent viscosity of 2.3 dimethylformamide.

*Example 28.*—The same starting materials and process was used as that described in Example 27 with the exception that 3.24 mg. of magnesium dimethoxide was used as a polymerization initiator in place of magnesium diethoxide of Example 27. After a reaction period of 95 minutes, there was recovered a dispersion containing 28.8 grams of polymeric particles which were recovered by filtration followed by washing with cyclohexane and drying the product in a vacuum oven at 60° C. This polymer exhibited an inherent viscosity of 1.1 in dimethylformamide and a portion of the polymer was pressed into a film having good surface qualities and exhibiting an exceptional toughness.

The above examples illustrate many of the metalorganic compounds which are useful as initiators in the polymerization of formaldehyde to produce high molecular weight polymers. The initiators are defined as metalorganic compounds having the general formula $$R_n M$$

where M is from the group consisting of a metal and a halide of a multivalent metal. The definition given in Gilman's "Organic Chemistry" is adopted herein for purposes of defining a metal in this invention. The preferred metals are those elements in groups I, II, III, and IV of the periodic table, exclusive of boron, carbon and silicon, which elements are not classified as metals by Gilman. R in the above formula is a member of the group consisting of hydrogen, hydrocarbon, oxyhydrocarbon, thiohydrocarbon, and acyloxy, and $n$ is any integer from 1 to 4.

These metalorganic compounds having the formula $R_n M$ which are operable in the process of this invention fall into several recognized chemical substances such as, (1) Metal hydrides where R is hydrogen. Included in this group are calcium hydride and sodium hydride.

(2) Organometallic compounds where R is alkyl, cycloalkyl, or aryl. Included in this group are dimethylcadmium, diphenyltin, and diphenylmercury.

(3) Metal alcoholates where R is alkoxy, cycloalkoxy, or aryloxy, and the metal is bonded to the oxygen of the alcoholate radical. Included in this group are decoxysodium, aluminum isopropoxide, and magnesium diethoxide.

(4) Metal mercaptides where R is thioalkyl, thiocycloalkyl or thioaryl, and the metal is bonded to the sulfur of the thiohydrocarbon radical. Included in this group are the copper and zinc mercaptides.

(5) Metal salts where R is an acyloxy radical and the metal is bonded to the oxygen attached to the replaceable hydrogen in the acid group. Included in this group are aluminum stearate, copper abietate, and copper stearate.

(6) Metalorganic compounds in which M is a halide of a multivalent metal and R is alkyl, cycloalkyl, aryl, alkoxy, cycloalkoxy, aryloxy, thioalkyl, thiocycloalkyl, or thioaryl, where the metal is bonded to a halogen as well as to the carbon, oxygen, or sulfur of an organic radical. Where R is alkyl, cycloalkyl, or aryl this compound is a Grignard reagent. Included in this group are phenyl magnesium bromide and methoxymagnesium chloride. Of the above six classes the preferred groups are the metal salts, of which copper abietate is particularly desirable, and the metal alcoholates, of which aluminum isopropoxide is particularly desirable.

The reaction medium may be any of a variety of compounds which are inert to the reactants and the product, and preferably the reaction medium is a liquid at about room temperature. Suitable reaction media include the aliphatic, cycloaliphatic, and aromatic hydrocarbons, hydrocarbon halides, ethers, etc. The preferred reaction media are the hydrocarbons of 3 to 10 carbon atoms, for example, propane, butane, pentane, hexane, heptane, cyclohexane, decahydronaphthalene, benzene, toluene, and xylene.

The temperature and pressure of the reaction are not critical. Temperatures may vary from the freezing point to the boiling point of the reaction medium, which range is from about −110° C. to about 100° C. Atmospheric pressure is normally employed for convenience, although the pressure may be subatmospheric or superatmospheric in certain embodiments of this invention. The preferred temperature range is from about −50° C. to about 50° C. and the preferred pressure is atmospheric.

The formaldehyde monomer may be derived from any source although the formaldehyde should be purified prior to polymerization. Sources of formaldehyde include paraformaldehyde, alpha-polyoxymethylene, formaldehyde solutions, and the hemiformals. It is desirable that the formaldehyde monomer be substantially anhydrous when high molecular weight polymers are to be made therefrom. "Substantially anhydrous formaldehyde," in this invention, is intended to mean monomer containing less than 0.5% by weight of water, and preferably less than 0.1% by weight of water. A final purification may be obtained by passing formaldehyde through one or more cold traps held at about 0° C. or less. These traps may be in the form of empty U-tubes, packed U-tubes, liquid hydrocarbon through which the formaldehyde is bubbled, or other forms familiar to chemists and engineers.

The amount of reactants is not critical. The weight ratio of formaldehyde to reaction medium may vary from about 1:1 to about 1:1000, the choice depending on the thickness desired in the slurry which is formed during the reaction. preferred limits are about 4 to 100 parts by weight of reaction medium per part of formaldehyde polymer, it being understood that essentially all of the formaldehyde monomer is recovered as polymer. The amount of initiator is conveniently related to the amount of reaction medium in terms of weight of initiator per volume of reaction medium. On this basis the initiator concentration may vary from about 1 to about 1000 or more milligrams (mg.) per liter of reaction medium. The upper limit is only governed by economics since a higher concentration would be operable although of no advantage over the range given herein. Preferred limits of initiator concentration are from about 1 to about 250 mg. of initiator per liter of reaction medium.

The initiator is normally placed in the reaction prior to the introduction of the monomeric formaldehyde, although this procedure is not critical since the formaldehyde may be introduced first so as to saturate the medium prior to introduction of the initiator by injection methods.

The process of this invention may incorporate the use of antioxidants, dispersants, mixtures of initiators, and other features which might occur to skilled chemists. For example, secondary or tertiary aromatic amines, such as diphenylamine, may be employed in the polymerization reaction to reduce oxidative effects. Mercapto compounds such as 2-mercaptobenzimidazole may be employed as antioxidants which may also impart an added initiator effect. Other initiators such as triphenylphosphine, aliphatic amines, polymeric tertiary amines, and the like, may be used in conjunction with the organometallic initiators of this invention.

The polymers produced by the process of this invention may be acetylated to improve their thermal stability by the process described in copending application Serial No. 443,702, filed by Dal Nogare and Punderson on July 15, 1954, now abandoned.

Polymers made by the process of this invention are useful in the preparation of films, fibers, filaments, and molding compositions. Formaldehyde polymers having a high molecular weight are exceptional in their toughness properties, and therefore are admirably suited for the above-mentioned uses.

We claim:

1. A process for preparing a high molecular weight addition polymer of formaldehyde comprising contacting substantially anhydrous monomeric formaldehyde with a polymerization initiator which is a metalorganic compound, in which the metal has a valence from 1 to 4, and is a member of the group consisting of metal hydrides, metal alkyls, metal cycloalkyls, metal aryls, metal alcoholates, metal mercaptides, metal carboxylates, alkyl metal halides, cycloalkyl metal halides, aryl metal halides, alkoxy metal halides, cycloalkoxy metal halides, aryloxy metal halides, alkylthio metal halides, cycloalkylthio metal halides, and arylthio metal halides, and recovering a high molecular weight addition polymer of formaldehyde.

2. The process of claim 1 in which the polymerization takes place at −110° C. to 100° C. in a liquid hydrocarbon reaction medium.

3. The process of claim 1 in which the polymerization takes place at −50° C. to 50° C. in a reaction medium which consists essentially of a liquid hydrocarbon having 3 to 10 carbon atoms per molecule.

4. A process for preparing a high molecular weight addition polymer of formaldehyde comprising introducing substantially anhydrous monomeric formaldehyde into a reaction medium maintained at −50° C. to 50° C. and comprising a liquid hydrocarbon and a polymerization initiator, said hydrocarbon having 3 to 10 carbon atoms per molecule and said initiator being a metalorganic compound, in which the metal has a valence from 1 to 4, and being a member of the group consisting of metal hydrides, metal alkyls, metal cycloalkyls, metal aryls, metal alcoholates, metal mercaptides, metal carboxylates, alkyl metal halides, cycloalkyl metal halides, aryl metal halides, alkoxy metal halides, cycloalkoxy metal halides, aryloxy metal halides, alkylthio metal halides, cycloalkylthio metal halides, and arylthio metal halides, said hydrocarbon being present in an amount of 4 to 100 parts per part of formaldehyde and said initiator being present in the amount of 1 to 1000 milligrams per liter of hydrocarbon, and recovering a high molecular weight polymer of formaldehyde.

5. The process of claim 4 in which said initiator is a copper salt.

6. The process of claim 4 in which the initiator is copper abietate.

7. The process of claim 4 in which the initiator is aluminum isopropoxide.

References Cited in the file of this patent

UNITED STATES PATENTS

| 2,162,616 | Herrmann et al. | June 13, 1939 |
| 2,178,523 | Schmidt et al. | Oct. 31, 1939 |
| 2,519,550 | Craven | Aug. 22, 1950 |
| 2,551,365 | Craven | May 1, 1951 |
| 2,734,889 | Starr | Feb. 14, 1956 |

OTHER REFERENCES

Ellis: "The Chemistry of Synthetic Resins," vol. 1, pages 352–357; published by Reinhold Pub. Corp., New York, N. Y., 1935.